United States Patent
Larose, Jr. et al.

(10) Patent No.: US 9,797,286 B2
(45) Date of Patent: *Oct. 24, 2017

(54) SCR FILTER WASHCOAT THICKNESS EFFICIENCY COMPENSATION SYSTEM

(71) Applicant: GM Global Technology Operations LLC, Detroit, MI (US)

(72) Inventors: Thomas Larose, Jr., Howell, MI (US); Christopher Whitt, Howell, MI (US); Christopher C. Swoish, Lapeer, MI (US); Justin Adam Shetney, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 854 days.

This patent is subject to a terminal disclaimer.

(21) Appl. No.: 14/066,877

(22) Filed: Oct. 30, 2013

(65) Prior Publication Data

US 2015/0118112 A1 Apr. 30, 2015

(51) Int. Cl.
*F01N 3/00* (2006.01)
*F01N 3/20* (2006.01)
(Continued)

(52) U.S. Cl.
CPC ............... *F01N 3/20* (2013.01); *F01N 3/035* (2013.01); *F01N 3/208* (2013.01); *F01N 11/002* (2013.01);
(Continued)

(58) Field of Classification Search
USPC .......... 60/274, 286, 295, 297, 301, 303, 311
See application file for complete search history.

(56) References Cited

U.S. PATENT DOCUMENTS

| 5,833,932 A | 11/1998 | Schmelz | |
|---|---|---|---|
| 8,333,062 B2 * | 12/2012 | Sun | B01D 53/90 60/274 |

(Continued)

FOREIGN PATENT DOCUMENTS

EP 0617199 A1 9/1994

OTHER PUBLICATIONS

German Office Action for Application No. 10 2014 115 631.5, dated Apr. 3, 2017, 5 pages.

*Primary Examiner* — Binh Q Tran
(74) *Attorney, Agent, or Firm* — Cantor Colburn LLP

(57) ABSTRACT

An exhaust treatment system includes an SCRF device, a reductant delivery system, and an SCR storage module. The SCRF device includes a filter portion having a washcoat formed thereon that defines a washcoat thickness (WCT). The reductant delivery system is configured to inject a reductant that reacts with the washcoat based on a reductant storage model. The SCR storage module is in electrical communication with the reductant delivery system to provide the reductant storage model the amount of reductant to be injected based on the reductant storage model. The exhaust treatment system further includes a WCT compensation module configured to electrically communicate a WCT compensation value to the SCR storage module. The SCR storage module modifies the reductant storage model according to the WCT compensation value such that the amount of ammonia that slips from the SCRF device is reduced thereby increasing a storage efficiency of the SCRF device.

19 Claims, 2 Drawing Sheets

(51) Int. Cl.
*F01N 11/00* (2006.01)
*F01N 3/035* (2006.01)

(52) U.S. Cl.
CPC ........ *F01N 11/005* (2013.01); *F01N 2550/02* (2013.01); *F01N 2560/06* (2013.01); *F01N 2560/07* (2013.01); *F01N 2560/08* (2013.01); *F01N 2610/02* (2013.01); *F01N 2900/0416* (2013.01); *F01N 2900/0601* (2013.01); *F01N 2900/1602* (2013.01); *F01N 2900/1606* (2013.01); *F01N 2900/1616* (2013.01); *F01N 2900/1621* (2013.01); *F01N 2900/1622* (2013.01); *Y02T 10/24* (2013.01); *Y02T 10/47* (2013.01)

(56) References Cited

U.S. PATENT DOCUMENTS

| | | | |
|---|---|---|---|
| 8,656,702 B2* | 2/2014 | Alm | F01N 13/009 60/285 |
| 8,661,790 B2* | 3/2014 | Gonze | F01N 9/00 60/286 |
| 9,133,747 B2* | 9/2015 | Larose, Jr. | F01N 3/18 |

* cited by examiner

SCR FILTER WASHCOAT THICKNESS EFFICIENCY COMPENSATION SYSTEM

CROSS-REFERENCE TO RELATED APPLICATION(S)

Reference is made to U.S. application Ser. No. 14/066,861, entitled "SCR FILTER WASH COAT THICKNESS AMMONIA COMPENSATION SYSTEM", which is filed on even date herewith, is assigned to same assignee as this application, and which the entire disclosure of the above-referenced application hereby being incorporated by reference in its entirety.

FIELD OF THE INVENTION

The present disclosure relates to exhaust treatment systems, and more specifically, to a selective catalyst reduction and a reductant delivery system.

BACKGROUND

Exhaust gas emitted from an internal combustion (IC) engine, is a heterogeneous mixture that may contain gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Exhaust gas treatment systems may include selective catalytic reductant (SCR) devices. The SCR device includes a substrate having a washcoat disposed thereon that operates to reduce the amount of NOx in the exhaust gas. The typical exhaust treatment system also includes a reductant delivery system that injects a reductant such as, for example, ammonia ($NH_3$), urea ($CO(NH_2)_2$), etc.). The SCR devices make use of the reductant to reduce the NOx. For example, when the proper amount of reductant is supplied to the SCR device under the proper conditions, the reductant reacts with the NOx in the presence of the SCR washcoat to reduce the NOx emissions. However, if the reduction reaction rate is too slow, or if there is excess reductant in the exhaust, ammonia can slip through the SCR device and be emitted to the environment.

SUMMARY OF THE INVENTION

In an exemplary embodiment of the disclosure, an exhaust treatment system comprises a selective catalyst reduction filter (SCRF) device that includes a filter portion. The filter portion has a washcoat disposed thereon defining a washcoat thickness (WCT). A reductant delivery system is configured to inject a reductant that reacts with the washcoat according to an initial reductant storage model. The SCRF device operates at a first efficiency based on the initial reductant storage model. The exhaust treatment system further includes a WCT compensation module and a storage module. The WCT compensation module is configured to electrically communicate a WCT compensation value based on the WCT of the SCRF device. The storage module is in electrical communication with the reductant delivery system and the WCT compensation module, and is configured to adjust the initial reductant storage model based on the WCT compensation value to generate a modified reductant storage module.

In another exemplary embodiment, a control module is configured to dynamically generate a modified, reductant storage model. The modified reductant storage model compensates for a washcoat thickness (WCT) of a selective catalyst reduction filter (SCRF) device included in a vehicle exhaust gas treatment system. The control module comprises a memory unit, a WCT module and a WCT compensation module. The memory unit stores an initial reductant storage model that controls operation of a reductant delivery system. The WCT module is configured to determine an actual WCT of the SCRF device. The WCT compensation module is in electrical communication with the WCT module. The WCT compensation module is configured to determine a WCT compensation value based on the actual WCT. The control module further includes a SCRF storage module in electrical communication with the WCT compensation module. The SCRF storage module is configured to adjust the initial reductant storage setpoint based on the WCT compensation value to generate the modified reductant storage setpoint.

In yet another exemplary embodiment, a method of dynamically generating a reductant storage model that compensates for a washcoat thickness (WCT) of a selective catalyst reduction filter (SCRF) device comprises determining an actual WCT of the SCRF device. The method further comprises determining a WCT compensation value based on the actual WCT. The method further comprises adjusting an initial reductant storage model based on the WCT compensation value to generate a modified, reductant storage model.

The above features of the present disclosure are readily apparent from the following detailed description of the various embodiments when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
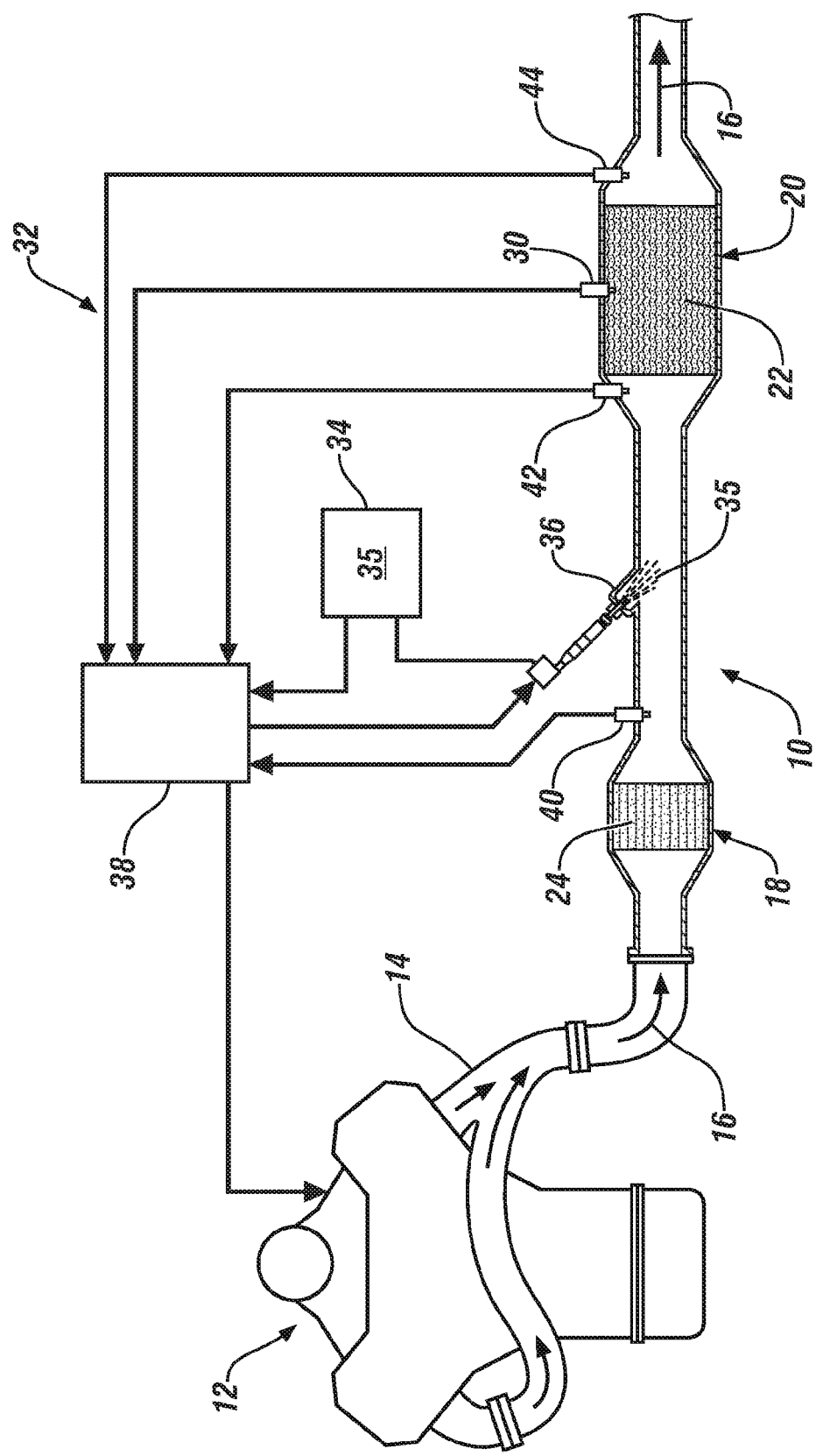
FIG. 1 is a schematic diagram of an exhaust gas treatment system including a reductant delivery system in accordance with exemplary embodiments.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems. Such engine systems may include, for example, but are not limited to diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust treatment devices include, but are not limited to, an oxidation catalyst device ("OC") 18, and a selective catalytic reduction filter ("SCRF") 20. The SCRF 20 includes a filter portion 22 having a catalyst containing washcoat disposed thereon as discussed in greater detail below. In at least one exemplary embodiment of the disclosure, the filter portion 22 is a PF, such as a diesel particulate filter, for example. As can be appreciated, the exhaust gas treatment system 10 of the present disclosure may include various combinations of one or more of the exhaust treatment devices shown in FIG. 1, and/or other exhaust treatment devices (not shown) and is not limited to the present example.

In FIG. 1, the exhaust gas conduit 14, which may comprise of several segments, transports exhaust gas 16 from the engine 12 to the various exhaust treatment devices 18, 20 of the exhaust gas treatment system 10. As can be appreciated, the OC 18 can be one of various flow-through, oxidation catalyst devices known in the art. In various embodiments the OC 18 may include a flow-through metal or ceramic monolith substrate 24 that is wrapped in an intumescent matte or other suitable support that expands when heated, securing and insulating the substrate. The substrate 24 may be packaged in a stainless steel shell or canister having an inlet and an outlet in fluid communication with the exhaust gas conduit 14. The substrate 24 can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 18 is useful in treating unburned gaseous and non-volatile HC and CO, which are oxidized to form carbon dioxide and water.

The SCRF 20 may be disposed downstream of the OC 18. As described above, the SCRF 20 includes a filter portion 22 having a catalyst containing washcoat disposed thereon. The catalyst containing washcoat may reduce NOx in the exhaust stream by utilizing the reductant to convert the NOx into $N_2$ and $H_2O$ as understood by those ordinarily skilled in the art. The catalyzed containing washcoat may utilize a reductant to reduce the NOx. The reductant may include, but is not limited to, ammonia ($NH_3$), and urea ($CO(NH_2)_2$). The catalyst containing washcoat may contain a zeolite and one or more base metal components such as iron (Fe), cobalt (Co), copper (Cu) or vanadium (V) which can operate efficiently to convert NOx constituents in the exhaust gas 16 into acceptable byproducts (e.g., diatomic nitrogen ($N_2$) and water ($H_2O$)) in the presence of $NH_3$. The efficiency at which the SCRF 20 converts the NOx is hereinafter referred to as "NOx conversion efficiency." The reductant utilized by the SCRF 20 may be in the form of a solid, a gas, a liquid, or an aqueous urea solution and may be mixed with air to aid in the dispersion of an injected spray generated by a reductant delivery system, which is discussed in greater detail below.

The filter portion 22 of the SCRF 20 is also configured to filter the exhaust gas 16 of carbon and other particulate matter. According to at least one exemplary embodiment, the filter portion 22 may be constructed using a ceramic wall flow monolith exhaust gas filter substrate that is wrapped in an intumescent or non-intumescent matte (not shown) that expands, when heated to secure and insulate the filter substrate which is packaged in a rigid, heat resistant shell or canister, having an inlet and an outlet in fluid communication with exhaust gas conduit 14. It is appreciated that the ceramic wall flow monolith filter substrate is merely exemplary in nature and that the filter portion 22 may include other filter devices such as wound or packed fiber filters, open cell foams, sintered metal fibers, etc. The filter substrate may include a ceramic filter element (e.g., a wall-flow element) configured to trap particulate matter included in the exhaust gas 16. The exhaust gas treatment system 10 may perform a regeneration process that regenerates the filter portion 22 by burning off the particulate matter trapped in the filter substrate, as known to those ordinarily skilled in the art.

The exhaust gas treatment system 10 may further include at least one pressure sensor 30 (e.g., a delta pressure sensor), as illustrated in FIG. 1. The delta pressure sensor 30 may determine the pressure differential (i.e., $\Delta p$) across the SCRF 20. Although a single delta pressure sensor 30 is illustrated, it is appreciated that a plurality of pressure sensors may be used to determine the pressure differential of the SCRF 20. For example, a first pressure sensor may be disposed at the inlet of the SCRF 20 and a second pressure sensor may be disposed at the outlet of the SCRF 20. Accordingly, the difference between the pressure detected by the second delta pressure sensor and the pressure detected by the first delta pressure sensor may indicate the pressure differential of the SCRF 20.

The exhaust gas treatment system 10 illustrated in FIG. 1 further includes a reductant delivery system 32 that introduces a reductant to the exhaust gas 16. The reductant delivery system 32 includes a reductant supply source 34, an injector 36, and a control module 38. The reductant delivery source 34 stores a reductant 35 and is in fluid communication with the injector 36. The reductant 35 may include, but is not limited to, $NH_3$, and urea. Accordingly, the injector 36 may inject a selectable amount of reductant 35 into the exhaust gas conduit 14 such that the reductant is introduced to the exhaust gas 16 at a location upstream of the SCRF 20.

The control module 38 may control the engine 12, the reductant delivery system 32 and the regeneration process based on sensed data provided by sensor and/or modeled data stored in memory. In various embodiments, the control module 38 further diagnoses one or more sub-systems and/or devices of the exhaust gas treatment system 10 based on one or more sensed and/or modeled inputs based on the diagnostic methods and systems of the present disclosure. In one example, the control module 38 is in electrical communication with a plurality of temperatures sensors 40-44. A first temperature sensor 40 is disposed at the outlet of the OC 18, a second temperature sensor 42 is disposed upstream from the SCRF 20 (e.g., the SCRF inlet) and a third temperature sensor 44 is disposed downstream from the SCRF 20 (e.g., the SCRF outlet).

The first temperature sensor 40 senses a temperature of the exhaust gas 16 at the outlet of the OC 18, and generates a temperature signal based thereon. The second temperature sensor 42 senses a temperature of exhaust gas 16 at the SCRF inlet and generates a second temperature signal based thereon. The third temperature sensor 44 senses a temperature of exhaust gas 16 at the SCRF outlet and generates a third temperature signal based thereon. Although the exemplary embodiment illustrated in FIG. 1 describes three sensors, it is appreciated that more or less sensors may be included. In addition, the invention is not limited to the sensor locations described above, or the use of the temperatures sensors.

The control module 38 may determine an absolute temperature of the SCRF 20 (i.e., the SCRF temperature). The SCRF temperature may be determined according to various, measurements, algorithms and/or models known to those of ordinary skill in the art. The temperature gradient is the rate of change of the SCRF temperature. That is, the SCRF temperature gradient is the change in SCRF temperature over time. The SCRF temperature may be measured in units of kelvins (K) per second (s), (i.e., K/s).

Generally speaking, the control module 38 receives one or more temperature signals from one or more of the temperatures sensors 40, 42, 44. The control module 38 may also determine one or more temperatures of the exhaust treatment system using one or more temperature models as understood by those ordinarily skilled in the art. The temperatures sensors 40, 42, 44, and/or the temperature models may generate one or more temperature signals indicating a determined temperature of a respective component and/or thermal area. For example the temperature sensors 40, 42, 44 and/or one or more temperature models may output a temperature signal indicating an SCRF temperature.

The control module 38 controls operation of the injector 36 according to a reductant storage model. In addition, the control module 38 may determine a compensation value that modifies the reductant storage model to improve the reductant storage efficiency of the SCRF 20. The compensation value may be based on a thickness of the washcoat disposed on the SCRF 20, as described in greater detail below. Accordingly, a more precise supply of reductant may be introduced to the exhaust stream such that the operating efficiency of the SCRF 20 may be increased.

Figure 2:
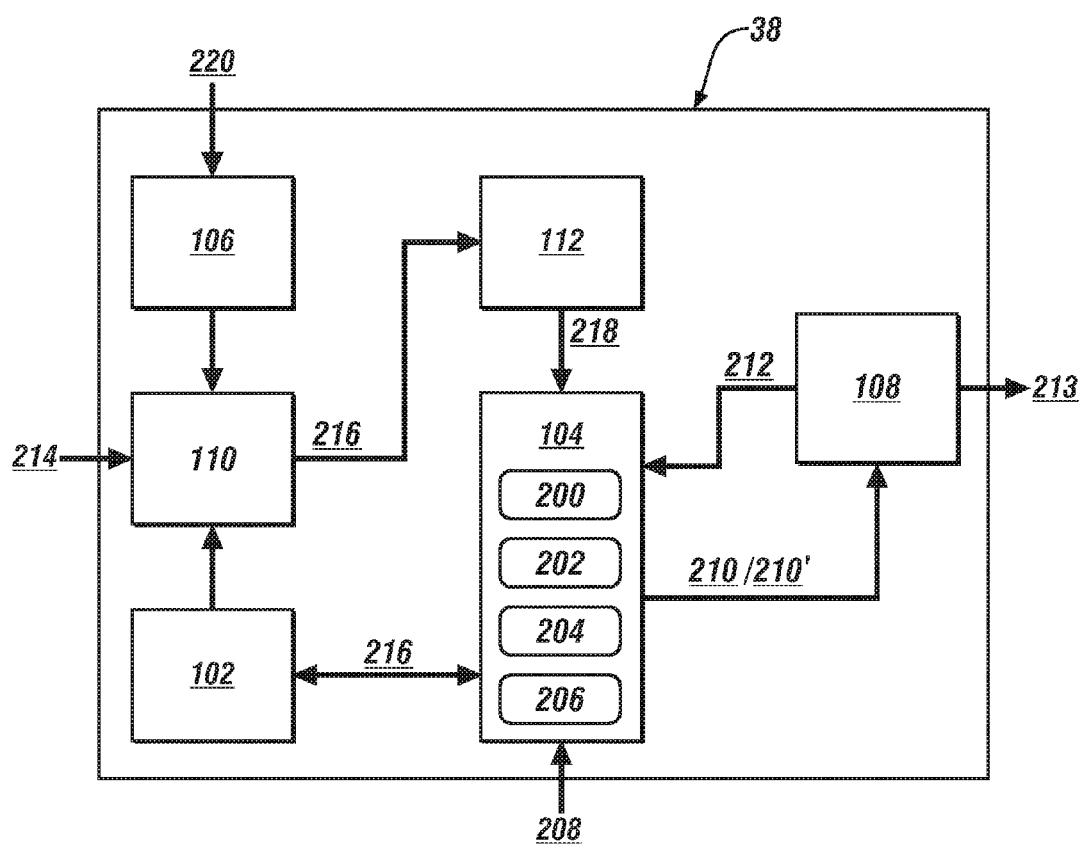
FIG. 2 is a block diagram illustrating a control module configured to determine a washcoat compensation value according to an exemplary embodiment of the disclosure.

Turning now to FIG. 2, a block diagram illustrates a control module 38 that determines a washcoat thickness (WCT) factor. The control module 38 further applies a WCT compensation value to the reductant storage model to generate an updated storage setpoint, which is calibrated with respect to the WCT of the SCRF 20. Various embodiments of the exhaust gas treatment system 10 of FIG. 1 according to the present disclosure may include any number of sub-modules embedded within the control module. As can be appreciated, the sub-modules shown in FIG. 2 may be combined or further partitioned as well. Inputs to the control module 38 may be sensed from the exhaust gas treatment system 10, received from other control modules, for example an engine control module (not shown), or determined by other sub-modules.

As illustrated in FIG. 2, the control module 38 according to at least one embodiment includes a memory 102, a SCRF storage module 104, an entry condition module 106, an injector control module 108, a WCT module 110, and a WCT compensation module 112. Each of the modules 104-112 may include a respective memory unit configured to store values, parameters and/or data models as needed. In addition, each of the modules 104-112 may interface and electrically communicate with the memory 102 to retrieve and update stored values, parameters and/or data models as needed.

In one embodiment, the memory 102 stores one or more threshold values, time periods over which the temperatures were measured, a number of configurable limits, maps, data values, variables, temperature models, and system models used to control the reductant delivery system 32. In at least one exemplary embodiment, the memory 102 stores a reductant storage model, which may be utilized to determine an amount of reductant to be stored on the SCRF 20 as described in detail above. The memory 102 may also store one or more temperature thresholds and/or temperature threshold ranges corresponding to a respective soot combustion temperature. In addition, the memory 102 may store one or more temperature models for determining the SCRF temperature. In at least one embodiment, the SCRF temperature is modeled according to temperature signals generated by one or more of the temperature sensors 40, 42, 44, and one or temperature models stored in the memory 102.

The SCRF storage module 104 provides a reductant storage model to the injector module 108. The reductant storage model may be used by the injector control module 108 to estimate the amount of reductant (e.g., the mass of reductant) that may be effectively stored in SCRF 20. The reductant storage model may be determined according to one or more sub-models including, but not limited to, a NOx conversion model 200, a reductant absorption model 202, a reductant desorption model 204, and an oxidation mode 206. The sub-models 200-206 may utilize various operating conditions 208 determined by various temperature sensors and/or models. The NOx conversion model 200 may be based on, for example, age of the SCRF 20, the SCRF temperature, exhaust flow rate, inlet $NO_2$ ratio, $NH_3$ storage on the SCRF 20, and inlet NOx concentration. The reductant absorption model 202 may be based on, for example, the SCRF temperature, exhaust flow rate, inlet $NH_3$ concentration, and $NH_3$ storage on the SCRF 20. The reductant desorption model 204 may be based on, for example, the SCRF temperature, exhaust flowrate, and $NH_3$ storage on the SCRF 20. The oxidation model 206 may be based on, for example, SCRF temperature, exhaust flowrate, and inlet $NH_3$ concentration.

During engine operation, operating conditions 208 (e.g., instant temperature of the SCRF 20, temperature gradient of the SCRF 20, etc.) may cause the SCRF 20 to store an insufficient amount of reductant 35 (e.g., $NH_3$). For example, $NH_3$ may slip from the SCRF 20 when the SCRF temperature increases. In addition, variations in thickness of the washcoat disposed on the SCRF 20 may affect storage of the reductant 35. To reduce the possibility of reductant slip, the SCRF storage module 104 provides the injector control module 108 with the reductant storage model 210.

The reductant storage model 210 identifies a target storage level of the SCRF 20 with respect to one or more operating conditions 208. For example, the reductant storage model 210 may indicate an amount of reductant 35 to be injected, which most efficiently converts NOx via the SCRF 20 without ammonia slipping from it. In addition, the SCRF storage module may dynamically adjust an initial reductant storage model 210 to generate a modified a reductant storage model 210'. The modified reductant storage model 210' indicates an amount of reductant typically stored on the SCRF 20, while taking into account the actual thickness of the washcoat disposed on the SCRF 20 as discussed in greater detail below. Based on the reductant storage model 210/210', the injector control module 108 controls the amount of reductant 35 injected into the exhaust gas 16. Accordingly, the reductant storage level of the SCRF 20 may be dynamically adjusted based on the actual thickness of the washcoat such that a more precise amount of reductant 35 in injected, which ultimately increases the operating efficiency of the SCRF 20.

The injector control module 108 is in electrical communication with the SCRF storage module 104 and the reductant delivery system 32. When an event occurs that triggers a need to inject reductant 35 into the exhaust gas 16, the injector control module 108 outputs a request signal 212 requesting a reductant storage model. In response to receiving the request signal 212, the SCRF module 104 outputs the reductant storage model 210/210' to the injector control module 108. The injector control module 108 receives reductant storage model signal 210/210', which identifies the amount of reductant to be stored in the SCRF 20 at a particular operating condition (e.g., an operating condition of the engine 12 and/or the SCRF 20). Based on the reductant storage model 210/210', the injector control module 108 outputs an injector control signal 213 that controls the injector 36 and the amount of reductant 35 delivered therefrom.

The WCT module 110 determines a thickness of the washcoat (i.e., an actual WCT) disposed on the SCRF 20. The WCT module 110 may determine the actual WCT based on the Δp of the SCRF 20 and a lookup table (LUT), for example. The Δp is determined, for example, according to a pressure signal 214 output by the pressure sensor 30. The LUT may be stored in the WCT module 110 or the memory 102, and includes a one or more predetermined nominal WCT values that are cross-referenced to a respective nominal Δp.

In at least one embodiment, the WCT module 110 determines the actual WCT by comparing the actual Δp indicated by the pressure signal 214 to the nominal Δp of the LUT. If the actual Δp matches the nominal Δp, the WCT module 110 determines that the actual WCT is the value indicated by the nominal WCT. Since there is no difference, or at least no substantial difference, between the actual WCT and the nominal WCT, the initial reductant storage model 210 may be maintained and provided to the injector control module 108.

If, however, the actual WCT does not match the nominal WCT, the WCT module 110 may determine that the actual WCT deviates from the nominal WCT. In at least one embodiment, the WCT module 110 may determine the actual WCT as a percentage value with respect the nominal WCT. For example, if the actual Δp is less than the nominal Δp, the WCT module 110 may determine that the actual WCT is 95% of the nominal value (i.e., 0.95× the nominal WCT). If Δp is greater than the nominal Δp, than the WCT module 110 may determine that the actual WCT is 105% of the nominal value (i.e., 1.05× the nominal value).

In another embodiment, the LUT may cross-reference a plurality of predetermined Δp values with a respective predetermined WCT value. The cross-reference correlations of the predetermined Δp values and respective predetermined WCT values may be determined by experimental testing and stored in the LUT. Accordingly, the WCT module 110 may compare the Δp indicated by the Δp signal 214 to the predetermined Δp values of the LUT. When the Δp matches a predetermined Δp, the WCT module 110 cross-references the matched predetermined Δp to the corresponding predetermined WCT value to determine the actual WCT. Thereafter, the WCT module 110 may output a WCT signal 216 that indicates the actual WCT.

The WCT compensation module 112 is in electrical communication with the entry condition module 106, the WCT module 110, and the SCRF storage module 104. The WCT compensation module 112 is configured to determine one or more WCT compensation values that take into account (i.e., compensates) the actual WCT of the SCRF 20. More specifically, the WCT compensation module 112 receives the WCT signal 216, which indicates the actual WCT of the SCRF 20 determined by the WCT module 110. Based on the actual WCT, the WCT compensation module 112 determines one or more WCT compensation values to compensate for a difference between the actual WCT and the nominal WCT. Upon determining the WCT compensation value, the WCT compensation module 112 may generate a WCT compensation signal 218 indicating one or more of the WCT compensation values.

The entry condition module 106 may determine one or more entry conditions 220. The entry conditions 220 include, but are not limited to, exhaust temperature, SCRF temperature, and engine operating time. The entry conditions 220 may be received by the entry condition module 106 from one or more sensors installed on the vehicle. When the entry conditions 220 satisfy one or more thresholds, the entry condition module 106 outputs a trigger signal 222 that commands the WCT module 110 to determine the actual WCT. If the actual WCT does not match the nominal WCT, the WCT module 110 outputs the WCT signal 216 to the WCT compensation module 112. Upon receiving the WCT signal 216, the WCT compensation module 112 may generate the WCT compensation signal 218 indicating one or more WCT compensation values as described above.

The SCRF module 104 receives the compensation signal 218 from the WCT module 112 indicating one or more WCT compensation values. The SCRF module 104 may apply the WCT compensation values to the initial reductant storage model 210 to generate a modified reductant storage model 210'. That is, the modified reductant storage model 210' is adjusted with respect to the initial reductant storage model 210 to compensate for the difference between the actual WCT and the nominal WCT. For example, one or more WCT compensation values may be applied to the entire initial reductant storage module 210, for example. In another example, one or more WCT compensation values may be applied to the sub-models 200-206 individually. For example, a compensation value may be applied to a first set of sub-models 200, 202, while not applied to a second set of sub-models 204, 206. In addition, different WCT compensation values may be applied to different individual sub-models 200-206. Accordingly, the modified reductant storage model 210' generated according to exemplary embodiments of the present disclosure is more accurate than conventional reductant storage models.

More specifically, conventional reductant storage models are generated without taking into account a thickness of the washcoat disposed on an exhaust treatment device. However, the thickness of the catalyst containing washcoat disposed on the filter portion 22 of the SCRF 20 may vary. Reasons for variations in the thickness of the washcoat include, but are not limited to, variations in washcoat deposition process, thickness degradation caused by aging, etc. The variation in the thickness of the washcoat may affect the operating efficiency of a SCRF 20. Consequently, a conventional reductant storage model based on a nominal WCT is inaccurate when the actual WCT deviates from the nominal WCT. The inaccuracy of the reductant storage model results in over-injecting and/or under-injecting reductant 35 into the exhaust gas 16, thereby reducing the operating efficiency of the SCRF 20 and/or increasing the risk to slip ammonia from the SCRF 20.

Unlike conventional reductant storage models, the SCRF storage module 104 modifies the initial reductant storage model 210 based on the WCT compensation value. The modified reductant storage model 210', therefore, compensates for a difference in the actual WCT with respect to the nominal WCT such that a more accurate reductant storage model is dynamically generated. When the SCRF module 104 receives the request signal 212, the SCRF module 104 outputs the modified reductant storage model 210' to the injector control module 108. The injector control module 108 controls injection of the reductant 35 based on the modified reductant storage model 210', which compensates for a variation in the actual WCT with respect to the nominal WCT. Accordingly, a more precise amount of reductant 35 is injected, thereby increasing the overall operating efficiency of the SCRF 20.

Figure 3:
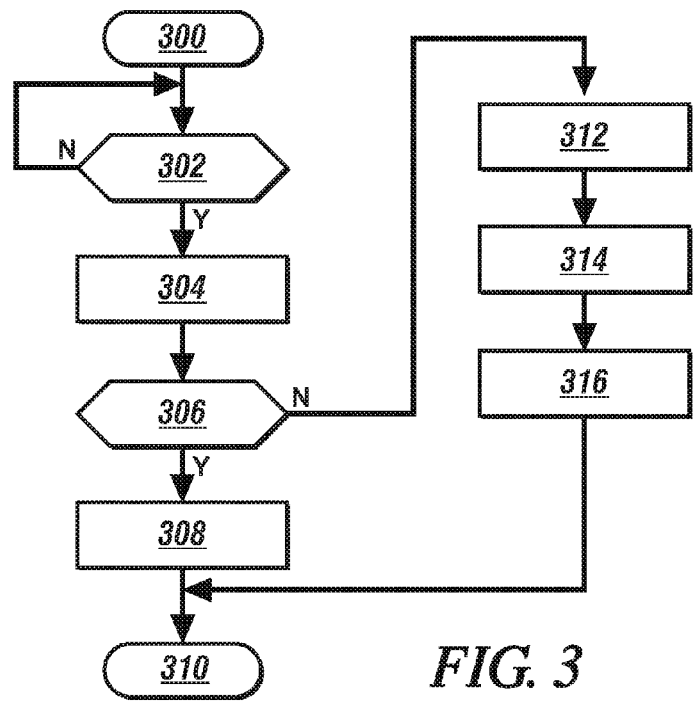
FIG. 3 is a flow diagram illustrating a method of adjusting a reductant storage model according to an exemplary embodiment of the disclosure.

Referring now to FIG. 3, a flow diagram illustrates a method of adjusting a reductant storage model to compensate for a variation in thickness of a washcoat disposed on a SCRF according to an exemplary embodiment of the disclosure. The method begins at operation 300, and proceeds to operation 302 to determine whether one or more entry conditions are satisfied. One or more entry conditions may be deemed satisfied when the monitored entry conditions exceed a threshold value, for example. If the entry conditions are not satisfied, the method returns to operation 302 and continues monitoring the entry conditions. If, however, the entry conditions are satisfied, an actual thickness of the washcoat (i.e., actual WCT) disposed on the SCRF is determined at operation 304. At operation 306, the actual WCT is compared to a predetermined nominal WCT. If the actual WCT matches the nominal WCT, an initial reductant storage model is maintained at operation 308, and the method ends at operation 310.

If the actual WCT does not match the nominal WCT at operation 306, a variation in the thickness of WCT with respect to the nominal WCT is determined at operation 312. At operation 314, one or more WCT compensation values are determined. At operation 316, the WCT compensation values are applied to the initial reductant storage model to generate a modified reductant storage model, and the method ends at operation 310. In at least one embodiment, the WCT compensation values may be applied to the entire reductant storage module, for example. In another example, the WCT compensation values may applied to individual sub-models (e.g., the NOx conversion model, the reductant absorption model, the reductant desorption model, and/or the oxidation model) used to generate the overall reductant storage model. In another example, different compensation values may be applied to different sub-models of the initial reductant storage model to generate the modified reductant storage model.

As used herein, the term "module" refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the present disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust treatment system, comprising:
a selective catalyst reduction filter (SCRF) device including a filter portion having a washcoat disposed thereon that defines a washcoat thickness (WCT);
a reductant delivery system configured to inject a reductant that reacts with the washcoat according to an initial reductant storage model, the SCRF device operating at a first efficiency based on the initial reductant storage model;
an Electronic Control Unit (ECU) programmed to execute control of the exhaust treatment system, the ECU comprising:
a WCT compensation module configured to electrically communicate a WCT compensation value based on the WCT of the SCRF device; and
an SCRF storage module in electrical communication with the reductant delivery system and the WCT compensation module, the SCRF storage module configured to adjust the initial reductant storage model based on the WCT compensation value to generate a modified reductant storage model.

2. The exhaust treatment system of claim 1, wherein the modified reductant storage model controls the reductant delivery system such that the SCRF device operates at a second efficiency that is greater than the first efficiency.

3. The exhaust treatment system of claim 2, wherein the ECU further comprises a WCT module in electrical communication with the WCT compensation module, the WCT module configured to determine the WCT of the SCRF device.

4. The exhaust treatment system of claim 3, wherein the WCT module determines the WCT of the SCRF device based on a pressure differential of the filter portion.

5. The exhaust treatment system of claim 4, wherein the WCT is determined as a percentage difference with respect to a predetermined nominal WCT.

6. The exhaust treatment system of claim 4, wherein the WCT module determines the WCT based on a comparison between the pressure differential and a lookup table (LUT), the LUT comprising a plurality of predetermined pressure differential values that are cross-referenced to a respective predetermined WCT value.

7. The exhaust treatment system of claim 6, wherein the WCT module determines an actual WCT in response the pressure differential matching an identified predetermined pressure differential value, the actual WCT determined as the predetermined WCT value corresponding to the identified predetermined pressure differential value.

8. The exhaust treatment system of claim 4, wherein the initial reductant storage model comprises a plurality of sub-models, and the WCT compensation model applies the compensation value to all of the sub-models.

9. The exhaust treatment system of claim 4, wherein the initial reductant storage model comprises a plurality of sub-models, and the compensation value is applied to a first set of sub-models while not applied to a second set of sub-models.

10. A control module configured to dynamically generate a reductant storage model that compensates for a washcoat thickness (WCT) of a selective catalyst reduction filter (SCRF) device included in a vehicle exhaust gas treatment system, the control module comprising:
a memory unit that stores an initial reductant storage model that controls operation of a reductant delivery system;
a WCT module configured to determine an actual WCT of the SCRF device;
a WCT compensation module in electrical communication with the WCT module, the WCT compensation module configured to determine a WCT compensation value based on the actual WCT; and
a SCRF storage module in electrical communication with the WCT compensation module, the SCRF storage module configured to adjust the initial reductant storage model based on the WCT compensation value to generate a modified reductant storage model.

11. The control module of claim 10, further comprising an injector control module that controls an amount of reductant supplied by a reductant delivery system, the injector control module controlling an amount of reductant introduced to exhaust gas based on the modified reductant storage model such that an amount of ammonia that slips from the SCRF device is reduced.

12. The control module of claim 11, wherein the WCT module determines the actual WCT based on a pressure differential of a filter portion included with the SCRF device.

13. The control module of claim 12, wherein the memory stores a nominal WCT value, and wherein the actual WCT is determined as a percentage of the nominal WCT value.

14. The control module of claim 12, wherein the WCT module determines the actual WCT based on a comparison between the pressure differential and a lookup table (LUT) stored in the memory, the LUT comprising a plurality of predetermined pressure differential values cross-referenced to a respective predetermined WCT value.

15. The control module of claim 14, wherein the WCT module determines the actual WCT in response the pressure differential matching an identified predetermined pressure differential value, the actual WCT determined as the predetermined WCT value corresponding to the identified predetermined pressure differential value.

16. The control module of claim 12, wherein the initial reductant storage model comprises a plurality of sub-models, and the WCT compensation model applies the compensation value to all of the sub-models.

17. The control module of claim 16, wherein the initial reductant storage model comprises a plurality of sub-models, and the compensation value is applied to a first set of sub-models while not applied to a second set of sub-models.

18. A method executed by an Electronic Control Unit (ECU) to dynamically generate a reductant storage model that compensates for a washcoat thickness (WCT) of a selective catalyst reduction filter (SCRF) device included in a vehicle exhaust gas treatment system, the ECU executing the method comprising:
determining an actual WCT of the SCRF device;
determining an WCT compensation value based on the actual WCT; and
adjusting an initial reductant storage model based on the WCT compensation value to generate a modified reductant storage model; and
controlling an amount of reductant introduced to exhaust gas based on the modified reductant storage model such that an amount of ammonia that slips from the SCRF device is reduced.

19. The method of claim 18, wherein the determining an actual WCT further comprises determining a pressure differential of the SCRF device, and determining the actual WCT based on the pressure differential.

* * * * *